Figure 9:
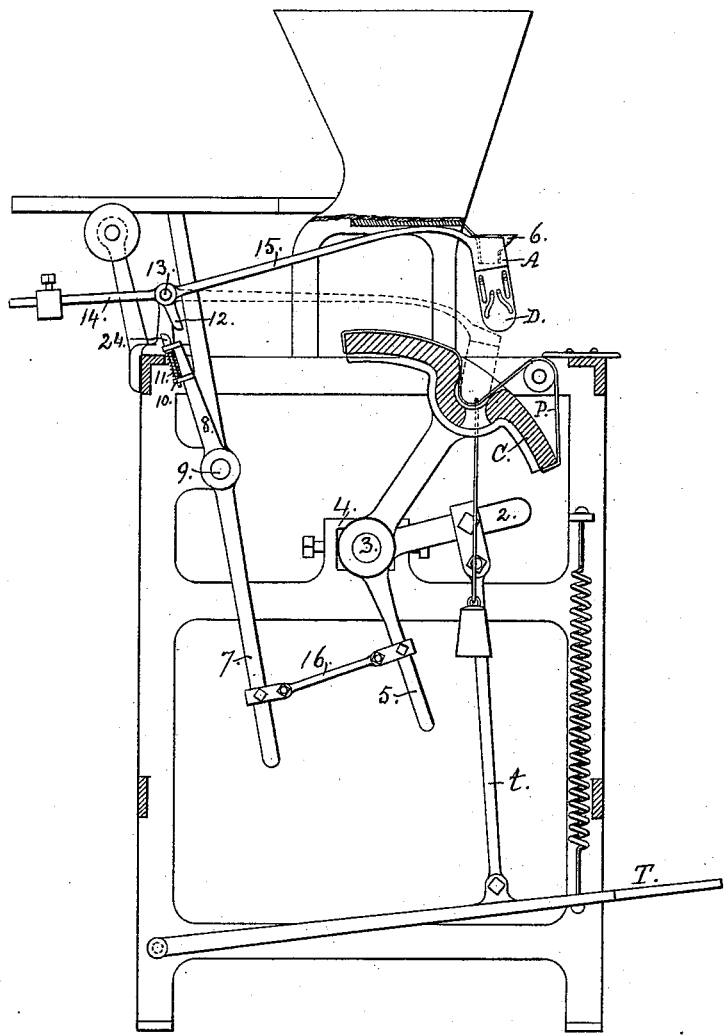

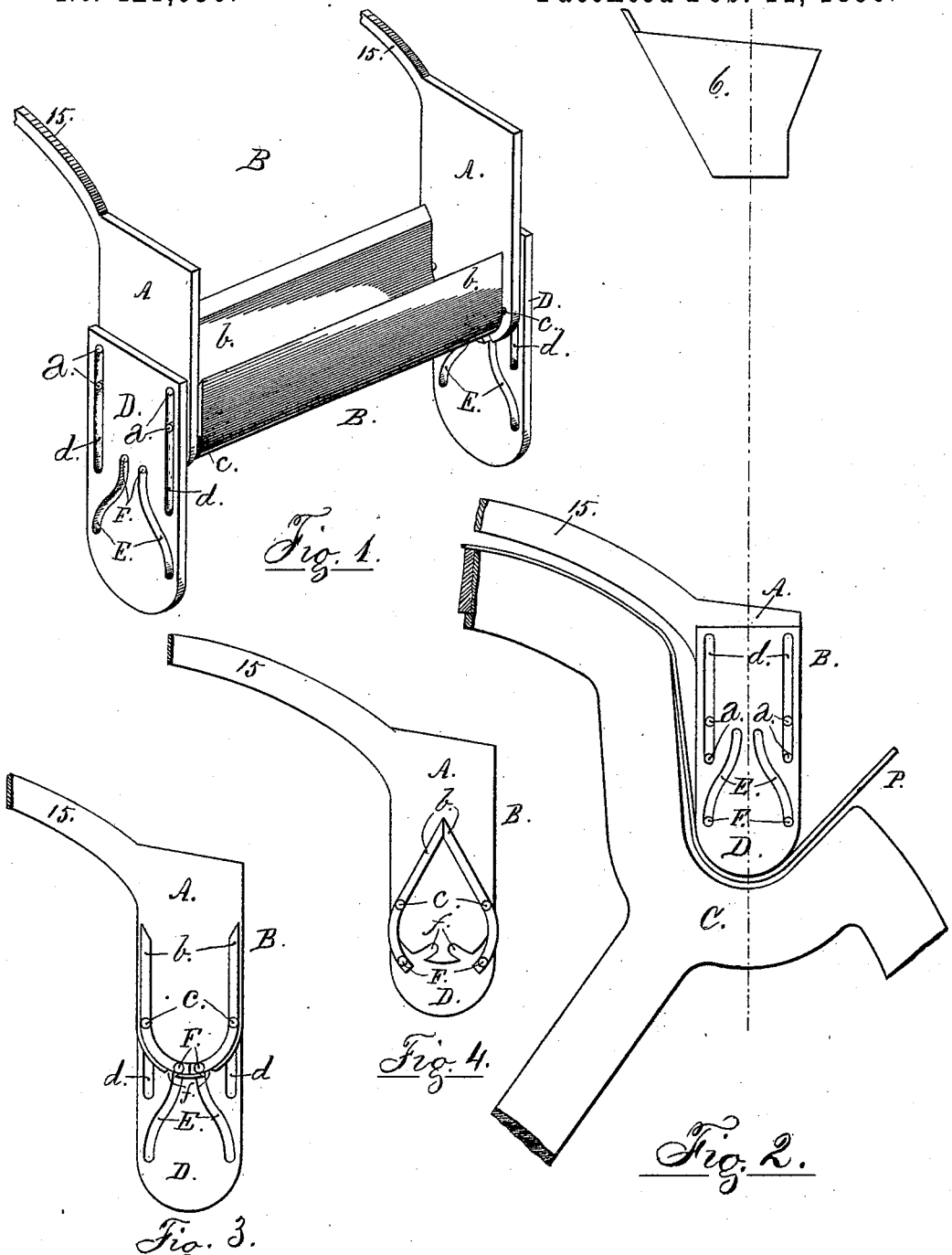

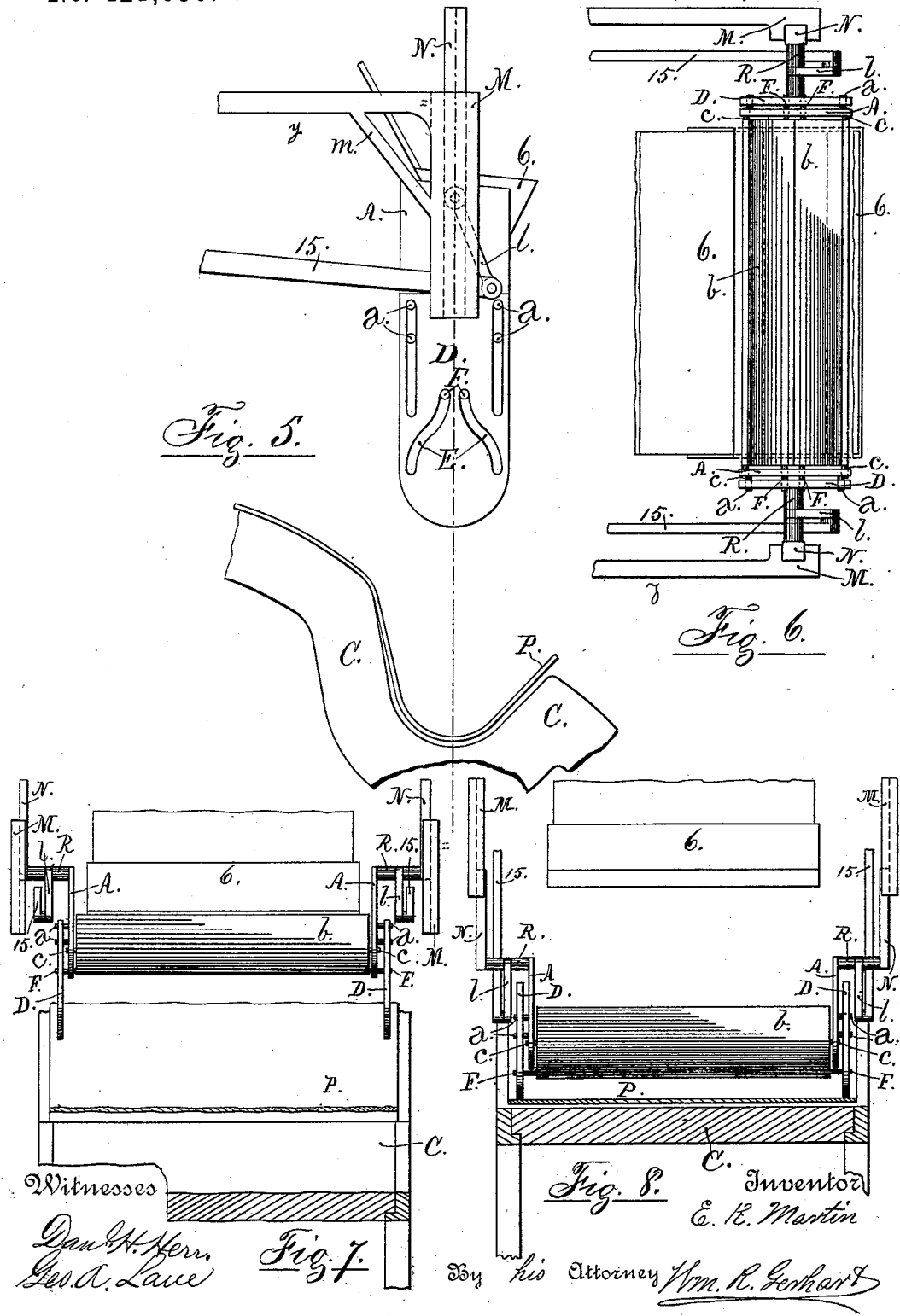

UNITED STATES PATENT OFFICE.

EDWIN K. MARTIN, OF LANCASTER, PENNSYLVANIA, ASSIGNOR TO THE CONESTOGA CIGAR MACHINE COMPANY, OF SAME PLACE.

CIGAR-BUNCHING MACHINE.

SPECIFICATION forming part of Letters Patent No. 421,030, dated February 11, 1890.

Application filed July 10, 1888. Serial No. 279,553. (No model.)

*To all whom it may concern:*

Be it known that I, EDWIN K. MARTIN, a citizen of the United States, residing in Lancaster, in the county of Lancaster and State of Pennsylvania, have invented certain Improvements in Cigar-Bunching Machines, of which the following is a specification.

My invention relates to improvements in the manner of conveying the cigar-filler from the hopper to the bunching-apron, and is an improvement on an invention for which Letters Patent No. 394,901, dated December 18, 1888, were issued by the United States to John H. Abraham and Edwin K. Martin.

The object of my invention is, first, to carry the tobacco-filler from the hopper to the bunching-apron, and, second, to construct a receptacle which will receive the tobacco from the hopper, convey it to the apron, and there deliver it as it came from the hopper.

In many of the cigar-bunching machines in use the tobacco is delivered from the hopper and distributed proportionably to the shape of the cigar; but in falling upon the apron the relative proportions of the parts as delivered from the hopper are destroyed. A continuous passage between the hopper and apron is frequently used; but while this to some extent overcomes the difficulty it cannot be depended upon with any degree of certainty. It is this difficulty that my invention effectually overcomes.

My invention consists in the combination, with the hopper and belt, of a carrier provided with a trap mechanism for moving the carrier between the hopper and belt, a sliding plate connected with the carrier and adapted to have motion imparted thereto by contact with the apron, and a connection between the trap and sliding plate.

My invention consists, further, in the combination, with the hopper and belt, of a carrier formed of rigid plates and provided with a trap, sliding plates secured to said rigid plates, and connections between the trap and sliding plates, whereby the trap is opened and closed by the movement of the sliding plates on the rigid plates.

My invention consists, further, in the combination, with the hopper and belt, of a carrier, a trap pivoted therein composed of double doors, mechanism for moving the carrier between the hopper and belt, and a device connected with the carrier and adapted to operate the doors by impact with the apron.

My invention consists, further, in the combination, with the end plates of a carrier, of a trap pivoted in the end plates, sliding plates guided upon the end plates, and connections between the trap and sliding plates, whereby the trap is operated by the movement of the sliding plates on the end plates.

My invention consists, also, in further details of construction of the carrier and of means for operating the same, to be hereinafter fully described and claimed.

This invention is intended more particularly as an attachment to the cigar-bunching machine for which Letters Patent have been issued, as before mentioned; but it is equally applicable to other machines.

In the accompanying drawings, Figure 1 is a perspective view representing the carrier as it is held under the hopper, with the doors of the trap closed to receive a charge of scraps, the hopper being removed. Fig. 2 is a side view of the carrier, showing it in the position it occupies as it forms the pocket in the bunching-apron and is in the act of emptying its charge. Fig. 3 is a side elevation of the carrier in the position shown in Fig. 1, but with the end removed. Fig. 4 is a view of the same, as shown in Fig. 2, the end being removed. Fig. 5 represents a side view of the carrier when held beneath the hopper, showing a modification of the operating mechanism. Fig. 6 is a top or plan view of the modification illustrated in Fig. 5, the parts occupying the same position as shown in that figure. Fig. 7 is a front view of the carrier as it is being lowered to the apron by the modified mechanism, portions of the table and bunching-apron being cut away. Fig. 8 is a similar view of the same, the carrier having formed the pocket and being in the act of delivering its charge. Fig. 9 is a side elevation of a cigar-bunching machine embodying my invention, portions being cut away to more fully show the operating mechanism.

In the drawings, 6 represents the hopper;

15, the arms which raise and lower the carrier; G, the rocking table, and P the bunching-apron.

A A are plates rigidly connected with the ends of the arms 15 and form the ends of the carrier B. There is a trap located between the lower portions of these end plates, composed of two doors b b, which are pivoted in the end plates by the spindles c. These spindles project from the center of the doors, as shown in Figs. 3 and 4. Two lugs a project from each side of the outer faces of both plates A. These lugs engage the vertical slots d in the sliding plates D, which hang on the lugs loosely, so that when the carrier is raised they drop of their own weight as far as the length of the slots d will allow, as shown in Fig. 1, and when the carrier descends they are pushed upward over the faces of the plates A A until the lower ends of the slots d are brought into contact with the lower lugs a.

Toward the lower ends of the sliding plates D there are guide-slots E. Two of these are cut through each plate, the upper ends of each pair being close together and almost perpendicular; but as they descend they separate with an outward curve until they are sufficiently far apart for the purpose to be described, when they again curve inward until their courses are parallel. Tilting lugs F project from the lower corners of the trap-doors and engage the guide-slots E. When the carrier is raised entirely clear of the apron P, the lugs F rest in the upper ends of the guide-slots E, and also engage the recesses f in the bottom of the end plates A A, as shown in Figs. 1 and 3, thus holding the lower edges of the trap-doors closed against each other. As the carrier descends and the lower ends of the sliding plates are brought into contact with the apron they are pushed upward over the faces of the end plates A A, and the lugs F are drawn out of the recesses f and forced to follow the courses of the guide-slots E, thus opening the doors b b to their full extent, as shown in Fig. 4.

A modification of the operating mechanism is shown in Figs. 5, 6, 7, and 8. Here vertical guide-plates M are supported by horizontal arms y, extending beyond the front of and secured to the hopper of the machine, and are strengthened by diagonal braces m. The inner faces of the plates M are provided with vertical grooves. (Shown by the dotted lines z, Figs. 5 and 7.) Instead of securing the arms 15 directly to the carrier, the upper end of each plate A is provided with a rigid arm R, rigidly secured to the lower end of a sliding guide N, which engages in a vertical groove in the inner face of each of the guide-plates M, and the arms 15 are pivotally connected with these arms R by links l. By this construction the carriers are raised and lowered vertically by the arms 15, the links l compensating for the relative change of position of the ends of the arms with reference to the carrier. The guide-plates M do not extend to the bunching-apron, but allow sufficient space below them for the proper operating of the rocking table and bunching-apron. To permit the carrier to be lowered to the apron and form the pocket therein, the sliding guides N are made of such length that they can be drawn a sufficient distance below the plates M for that purpose without becoming disengaged from the slots in those plates, as shown in Fig. 8. In all other respects in this case the carriers are made and operate precisely as described for the construction first described, similar letters in Figs. 5, 6, 7, and 8 indicating like parts with those in the first four figures.

It will be seen that the carrier consists of end pieces with a trap pivoted between them at their lower ends, the trap being divided into two sections, the lower edges of which meet when said trap is closed to carry the tobacco from the hopper to the belt; that when the carrier reaches the belt those sections revolve about their spindles, so as to open and deposit the tobacco from the center, and that when the sections so open the upper edges are brought together. When so opened, the inverted sections serve to press the tobacco previously deposited compactly down upon the belt.

The manner of operating the arms 15, to which the carrier is attached, is shown in Fig. 9. A treadle T, pivoted to the frame, as shown, is connected with an arm 2 by rod t, and the latter is connected to shaft 3, which is journaled in the boxes 4 of the frame. An arm 5 depends from the shaft 3, and is connected with the vibrating lever 7 by the link 16. The lever 7 is attached to the oscillating shaft 9, and on the shaft 9 there is an upwardly-projecting arm 8. The end of the arm 8 has a yielding point consisting of a bolt 24, working through lugs 10 on the side of the arm. Inside of the forward lug the bolt is provided with a collar, which serves as a bearing for a spring 11, coiled about it, the other end of which bears upon the inner lug. The outer end of the bolt is beveled, and engages an arm 12, projecting downward from the vibrating rod 13, with a yielding pressure. The arms 15 are secured to the rod 13, and are moved with the vibrations of that rod. As shown in the drawings, the carrier is held in engagement with the bottom of the hopper 6 by weights attached to the arm 14, also secured to the rod 13. The downward movement of the treadle throws the arm 8 in front of the arm 12 without causing any movement of the rod 13, because of the construction of the bolt 24 and the manner of attaching it to the arm 8. As the treadle is drawn back to the position shown in the drawings by the spring connecting it with the frame the arm 8 engages the arm 12 and forces the carrier down into the pocket formed in the bunching-apron, as shown by the dotted lines in Fig. 9. After the bolt 24 has escaped back of the end of the arm 12 the carrier is moved up to and under the hopper 6 by the weight on the arm 14.

Having thus fully described my invention, what I claim as new, and desire to secure by Letters Patent, is—

1. In a cigar-bunching machine, the combination, with the hopper and belt, of a carrier provided with a trap, mechanism for moving the carrier between the hopper and belt, a sliding plate connected with the carrier and adapted to have motion imparted thereto by contact with the apron, and a connection between the trap and sliding plate, substantially as and for the purpose specified.

2. In a cigar-bunching machine, the combination, with the hopper and belt, of a carrier formed of rigid plates and provided with a trap, sliding plates secured to said rigid plates, and connections between the trap and sliding plates, whereby the trap is opened and closed by the movement of the sliding plates on the rigid plates, substantially as and for the purpose specified.

3. In a cigar-bunching machine, the combination, with the hopper and belt, of a carrier, a trap pivoted therein composed of double doors, mechanism for moving the carrier between the hopper and belt, and a device connected with the carrier, adapted to open the doors by impact with the apron, substantially as and for the purpose specified.

4. In a cigar-bunching machine, the combination, with the hopper and belt, of a carrier, a trap pivoted therein composed of double doors, mechanism for moving the carrier between the hopper and belt, and a device connected with the carrier, adapted to open the lower edges of the doors and close the upper edges of the same together by impact with the apron, substantially as and for the purpose specified.

5. In a cigar-bunching machine, a carrier composed of end plates carrying side lugs and having pivoted therein a trap composed of double doors having tilting lugs, sliding plates having vertical guide-slots receiving the lugs on the end plates, and diverging slots for receiving the tilting lugs, whereby the sliding plates are made to operate the doors, substantially as set forth.

6. The combination, with the end plates A of the carrier, of a trap pivoted in the end plates, sliding plates D, guided upon the end plates, and connections between the trap and the sliding plates, whereby the trap is opened and closed by the movement of the sliding plates on the end plates, substantially as specified.

7. In a cigar-bunching machine, the combination, with the hopper and belt, of a carrier provided with a trap, vertical grooved plates M, rigidly secured to the frame, guides N, rigidly connected with the carrier and adapted to slide in the grooves of the plates M, and arms or levers connected with the carrier by links $l$, for moving it between the hopper and belt, substantially as specified.

E. K. MARTIN.

Witnesses:
JACOB HALBACH,
WM. R. GERHART.